United States Patent [19]

Ringler et al.

[11] 3,897,401
[45] July 29, 1975

[54] LIQUID POLYURETHANE REACTION MIXTURE

[75] Inventors: Harold R. Ringler; David R. MacFarland, both of Logan, Ohio

[73] Assignee: The Goodyear Tire & Rubber Company, Akron, Ohio

[22] Filed: Mar. 25, 1974

[21] Appl. No.: 454,048

[52] U.S. Cl. .................................. 260/77.5 AB
[51] Int. Cl.² ................................. C08G 18/24
[58] Field of Search ... 260/77.5 AB, 2.5 AB, 75 NB

[56] References Cited
UNITED STATES PATENTS

| | | |
|---|---|---|
| 3,240,730 | 3/1966 | Hostettler et al. ............... 260/75 NB |
| 3,535,256 | 10/1970 | Siano et al. .................... 260/45.75 S |
| 3,665,024 | 5/1972 | Oaks et al. ..................... 260/45.75 S |

Primary Examiner—M. J. Welsh
Attorney, Agent, or Firm—F. W. Brunner; J. D. Wolfe

[57] ABSTRACT

A liquid polyurethane reaction mixture suitable for making rotary castings and characterized by a pot life of at least 30 minutes at 75°F. but less than 16 minutes at 150°F., the mixture comprising polypropylene ether diol, 4,4'-methylene bis(cyclohexyl isocyanate), and a curative comprising butanediol-1,4 or a liquid mixture of trimethylol propane and butanediol-1,4, or a polypropylene ether diol of 800 to 1,500 molecular weight, and the catalyst of di(alkyl) tin-S,S'-bis(alkyl mercapto alkylate).

2 Claims, No Drawings

LIQUID POLYURETHANE REACTION MIXTURE

This invention relates to a liquid polyurethane reaction mixture characterized by a pot life of 30 to 60 minutes at 75°F. but less than 16 minutes at 150°F. and having excellent tensile and elongation properties.

In general, polyurethane reaction mixtures have either an extremely short pot life or a very long pot life and thus to find a liquid polyurethane reaction mixture which is suitable for making rotary castings, films, etc. without the use of solvents, presents problems. The art has recognized that catalysts may be added to vary and control the pot life but once the catalyst is added the pot life then is no longer independent and must be used within a very short time in order to properly shape the article. The polyester-urethane reaction mixtures that yield a high level of physical properties have viscosities which do not make them readily amenable to rotocasting.

The object of this invention is to provide a liquid polyurethane reaction mixture characterized by a relatively long pot life at room temperature but a short one at elevated temperature. The object of this invention may be achieved by forming a liquid polyurethane reaction mixture consisting of a mixture of a quasi-prepolymer of a polypropylene ether diol and 4,4'-methylene bis(cyclohexyl isocyanate) and then mixing the quasi-prepolymer with a polyol curative selected from the class of 1,4-butanediol or a liquid mixture of trimethylol propane and butanediol-1,4, or a polypropylene ether diol of 800 to 1,500 molecular weight, and mixtures of these, together with a di(alkyl)tin-S,S'-bis(alkyl mercapto alkylate) as a catalyst where the alkyl radicals contain from one to 20 carbon atoms and preferably four to 10 carbon atoms and the alkylate radicals contain from one to 20 carbon atoms and preferably one to four carbon atoms, shaping the desired article by suitably coating or filling a mold with the liquid reaction mixture, and reacting the mixture at elevated temperature to set and cure the mixture to obtain a cured, shaped polyurethane. Preferably the liquid polyurethane reaction mixture is formed and held at room temperature, or a temperature of 70°–100°F., and preferably 60° to 80°F. until the liquid mixture is to be shaped by the mold. At the time of shaping the article it is desirable that the liquid polyurethane reaction mixture should be at about 150°–190°F. to speed up rate of cure and reduce pot life of the mixture. Especially is 160°–180°F. desired when rotocasting relatively large articles such as skins for seat cushions.

When the quasi-prepolymer is made using 2 mols or less than 2 mols of 4,4'-methylene-bis-(cyclohexyl isocyanate) for each mol of polypropylene ether diol of 700 to 2,000 and preferably 800 to 1,500 molecular weight, the quasi-prepolymer is extremely viscous and does not readily yield a liquid, readily spreadable polyurethane reaction mixture at 70°F. and it is necessary to warm to 100°F. to obtain desirable viscosity ranges, but this materially reduces the pot life, i.e., the time the mixture can be poured and shaped. Therefore, the preferred range is 2.5 to 3.5 mols of isocyanate for each mol of diol to get liquid mixtures with best pot life, i.e., 30 minutes to 60 minutes in length at room temperature but less than 16 minutes, and preferably less than 10 minutes at 150°F. The quasi-prepolymer can be made according to any of the well known methods.

The catalysts is added preferably to the curative, or at the time the final mixture is made, usually about 0.05 to 0.25 weight percent of catalyst is used.

The curative is mixed preferably with the quasi-prepolymer at room temperature and the mixture is used before the pot life is spent, usually about 90 to 99 percent curative is used based on free or excess isocyanate in the quasi-prepolymer.

Liquid polyurethane reaction mixtures of this invention are well suited for shaping film, or rotatory casting of hollow articles or skins.

The nature of this invention can be more readily understood and appreciated by reference to the representative example where all parts are by weight unless otherwise indicated.

EXAMPLE I

A mol of a thousand molecular weight ethylene oxide capped polypropylene ether diol was degassed and reacted at preferably 200°F. with 3 mols of 4,4'-methylene bis(cyclohexyl isocyanate) to form a quasi-prepolymer having 9.32 percent free NCO. This quasi-prepolymer was used to form liquid polyurethane mixtures with the curative of Table 1 and 0.1 percent di(N-octyl)tin-S,S'-bis-isooctyl mercaptoacetate as the catalyst and the sheets formed had the physicals shown in the table after curing at 150° to 160°F. overnight. The curative blends A, B, C and D were mixed with sufficient of the quasi-prepolymer to equal 95 mol percent of the free NCO in the quasi-prepolymer.

Table 1

| Curative blend expressed as mole equivalents | A | B | C | D |
|---|---|---|---|---|
| The diol of the quasi-prepolymer | 0 | 0.5 | 0 | 0 |
| Butanediol-1,4 | 2.5 | 2.0 | 2.0 | 1.5 |
| Trimethylolpropane | 1.5 | 1.5 | 2.0 | 2.5 |
| Physical characteristics of liquid polyurethane reaction mixture | | | | |
| Brookfield Vis., cps at 72°F. | 3510 | 2510 | 3500 | 3120 |
| Pot life, minutes at 75°F. | 55 | 60 | 33 | 48 |
| Cure time, minutes at 155°F. | 11 | 15 | 11 | 11 |
| Physicals on cured sample | | | | |
| Tensile psi | 3860 | 2750 | 3380 | 3850 |
| Modulus, 100% psi | 1150 | 650 | 980 | 1330 |
| Elongation, % | 340 | 380 | 280 | 280 |
| Shore A hardness | 79 | 75 | 75 | 79 |

The degassed liquid polyurethane reaction mixture was charged to a hollow polyethylene mold of bottle shape and rotated in two planes to distribute the mixture uniformly over the surface of the polyurethane mold which was held at 150°–160°F. The liquid polyurethane reaction mixture was fully gelled in about 10 to 15 minutes and could be removed from the polyethylene mold to obtain a clear nondiscoloring polyurethane bottle.

Instead of rotocasting a bottle, a skin for a decorative seat cushion or crash pad could be molded in a mold for the specific article by adding a charge of the polyurethane and rotating in a hot mold to form the skin. The skin can be filled with a foamable polyurethane mixture and foamed and set to produce a finished seat cushion or crash pad to illustrate a few of the uses of this invention.

Although the practice of this invention has been represented with an ethylene oxide capped—approximately 5 to 10 mole percent—polypropylene ether diol, it should be appreciated that uncapped polypropylene ether diol can be used but reaction rates will be slower and larger amounts of catalyst will be used.

While certain representative embodiments and details have been shown for the purpose of illustrating the invention, it will be apparent to those skilled in this art that various changes and modifications may be made therein without departing from the spirit or scope of the invention.

What is claimed is:

1. A liquid polyurethane reaction mixture characterized by a pot life of at least 30 minutes at 75°F. but less than 16 minutes at 150°F., consisting of a mixture of a reaction product of one mol of a 700 to 2,000 molecular weight polypropylene ether diol with 2.5 to 3.5 mols of 4,4'-methylene bis-(cyclohexyl isocyanate), sufficient curative to be equivalent to 90 to 99 mol percent of the excess isocyanate in the reaction product and 0.05 to 0.25 weight percent of a catalyst of di(alkyl)tin-S,S'-bis(alkyl mercapto alkylate) where the alkyl radical contains from one to 20 carbon atoms and the alkylate radical contains from one to 20 carbon atoms and the curative is butanediol-1,4 or a liquid mixture of trimethylol propane and butanediol-1,4 or polypropylene ether diol of 800 to 1,500 molecular weight.

2. The liquid polyurethane reaction mixture of claim 1 wherein the polypropylene ether diol has a molecular weight of 800 to 1,500 and the catalyst is di(N-octyl)tin-S,S'-bis(isooctyl mercaptoacetate).

* * * * *

UNITED STATES PATENT OFFICE
CERTIFICATE OF CORRECTION

PATENT NO. : 3,897,401
DATED : July 29, 1975
INVENTOR(S) : Harold R. Ringler and David R. MacFarland It is certified that error appears in the above-identified patent and that said Letters Patent are hereby corrected as shown below:

In Table 1, column 2, line 36: "The diol of the quasi-"
should read -- The diol of the quasi-prepolymer --

In Table 1, column 2, line 37: "prepolymer Butanediol-1,4"
should read -- Butanediol-1,4 --

Signed and Sealed this thirteenth Day of April 1976

[SEAL]

Attest:

RUTH C. MASON
Attesting Officer

C. MARSHALL DANN
Commissioner of Patents and Trademarks